United States Patent
Liu et al.

(10) Patent No.: US 9,019,243 B2
(45) Date of Patent: Apr. 28, 2015

(54) OPTICAL COORDINATE INPUT DEVICE

(71) Applicant: Wistron Corporation, New Taipei (TW)

(72) Inventors: You-Xin Liu, New Taipei (TW);
Po-Liang Huang, New Taipei (TW);
Yu-Yen Chen, New Taipei (TW);
Shih-Wen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 10 days.

(21) Appl. No.: 14/107,455

(22) Filed: Dec. 16, 2013

(65) Prior Publication Data
US 2015/0070321 A1    Mar. 12, 2015

(30) Foreign Application Priority Data
Sep. 9, 2013  (TW) .............. 102132499 U

(51) Int. Cl.
*G06F 3/042* (2006.01)
*G06F 3/01* (2006.01)
*G06F 3/0488* (2013.01)

(52) U.S. Cl.
CPC .............. *G06F 3/0421* (2013.01); *G06F 3/016* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 2010/0328243 | A1* | 12/2010 | Wang et al. | 345/173 |
| 2013/0050559 | A1* | 2/2013 | Chen et al. | 348/335 |
| 2014/0313165 | A1* | 10/2014 | Lam et al. | 345/175 |

* cited by examiner

*Primary Examiner* — Muhammad N Edun
(74) *Attorney, Agent, or Firm* — Muncy, Geissler, Olds & Lowe, P.C.

(57) ABSTRACT

An optical coordinate input device is disclosed. The optical coordinate input device includes a frame, a first touch detection area, a second touch detection area, a first detection module, a second detection module, and a processing module. The second touch detection area overlap the first touch detection area. The first detection module is disposed on the frame and adjacent to the second touch detection area for detecting the first touch detection area to generate a first touch coordinate signal. The second detection module is disposed on the frame and adjacent to the first touch detection area for detecting the second touch detection area to generate a second touch coordinate signal, wherein the first and second detection module are disposed on different surface of the frame. The processing is used for executing a coordinate calculation procedure base on the first and the second touch coordinate signal.

14 Claims, 9 Drawing Sheets

OPTICAL COORDINATE INPUT DEVICE

FIELD

The exemplary embodiment(s) of the present invention relates to an optical coordinate input device. More specifically, the exemplary embodiment(s) of the present invention relates to an optical coordinate input device could be used in a super huge size optical coordinate input device.

BACKGROUND

With the improvement of the technology, touch control panels are widely used in the daily life, and the user could control the electronic device more intuitively. In the prior arts, the structures of the touch control panel are usually resistive-type or capacitance-type. However, resistive-type or capacitance-type touch control panel are only suitable for small size touch control panels, and the manufacturing cost would be increased dramatically when applying the aforementioned types on huge size touch control panels.

Therefore, an optical coordinate input device is provided in the prior art to solve the problem of high manufacturing cost when using the resistive-type or the capacitance-type touch control panel. Please refer FIG. 1, which is a schematic diagram of the optical coordinate input device of the prior art.

In FIG. 1, the optical coordinate input device 90 includes a detection area 91, a first camera module 92, a second camera module 93, a reflective frame 94, and a processing module 95. The detection area 91 is provided for being touched by the object 96. The first camera module 92 and the second camera module 93 would emit invisible light toward the reflective frame 94, and capture the signal reflected by the reflective frame 94. If the object 96 is near or touches the detection area 91, the object 96 would shell the light image reflected by the reflective frame 94, and thus the processing module 95 could calculate the coordinate of the object 96 according to the images captured by the first camera module 92 and the second camera module 93.

However, when the optical coordinate input device of the prior art is applied in a huge size apparatus, for example over than 100 inch, it would be limited by the resolution ability to the received signal of the processing module 95 and the weak reflected signals on the diagonal line emitted by the first camera module 92 and the second camera module 93. If we want to raise the resolution ability of the processing module 95, the lens of the first camera module 92 and the second camera module 93 have to be increased to improve the image quality and the resolution ability, and that would increase the cost hugely. In addition, if a corner signals want to be amplified, the emitting strength of the first camera module 92 and the second camera module 93 could be enhanced, but that would cause the signals of the touch-points near the first camera module 92 and the second camera module 93 to be overexposed when being received. When the processing module 95 executes the touch control algorithm, the overexposed signals would cause the incorrect coordinates near the camera modules.

Therefore, an optical coordinate input device used in the huge size device has to be invented to solve the disadvantages of the prior arts.

SUMMARY

The main object of the present invention is to provide an optical coordinate input device which could be adapted in a huge size device.

In order to achieve the aforementioned object, the optical coordinate input device of the present invention comprises a frame, a first touch detection area, a second touch detection area, a first detection module, a second detection module, and a processing module. The second touch detection area overlaps part of the first touch detection area, wherein the first touch detection area and the second touch detection area are provided for being by a user. The first detection module is disposed on the frame and adjacent to the second touch detection area for detecting the first touch detection area and generating a first touch coordinate signal when the user touches the first touch detection area. The second detection module is disposed on the frame and adjacent to the first touch detection area for detecting the second touch detection area and generating a second touch coordinate signal when the user touches the second touch detection area; wherein the first detection module and the second detection module are located on different surfaces of the frame. The processing module is electrically connected to the first detection module and the second detection module and provided for executing a coordinate calculation procedure according to the first touch coordinate signal and the second touch coordinate signal, thereby operating the first touch detection area and the second touch detection area simultaneously.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

For facilitating understanding and clarifying the object, characteristics and advantages of the present invention, following specific embodiments and figures of the present invention are presented to make a detail description.

Figure 1:
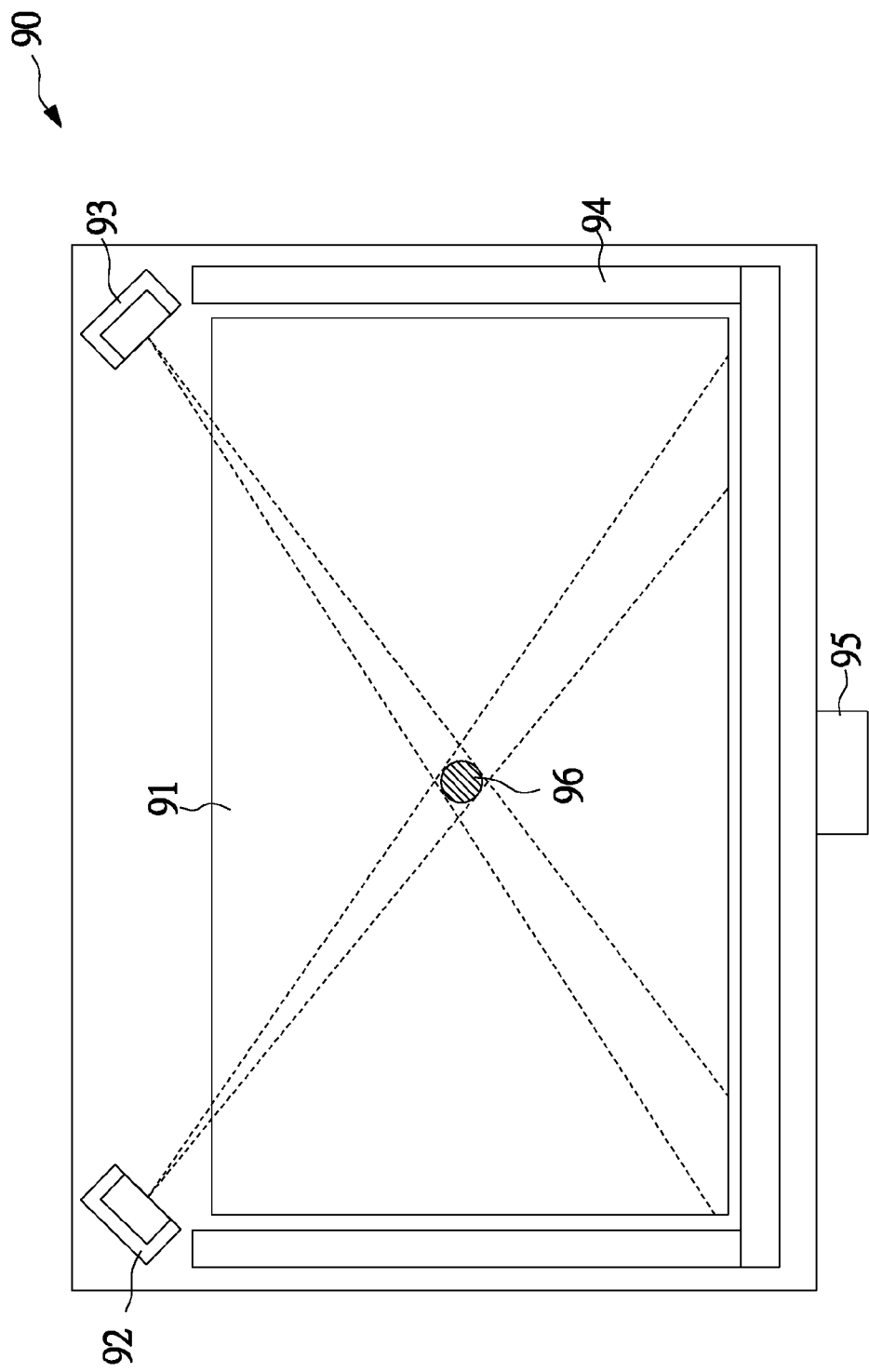
FIG. 1 is a schematic diagram of the optical coordinate input device of with the prior art.
Figure 2:
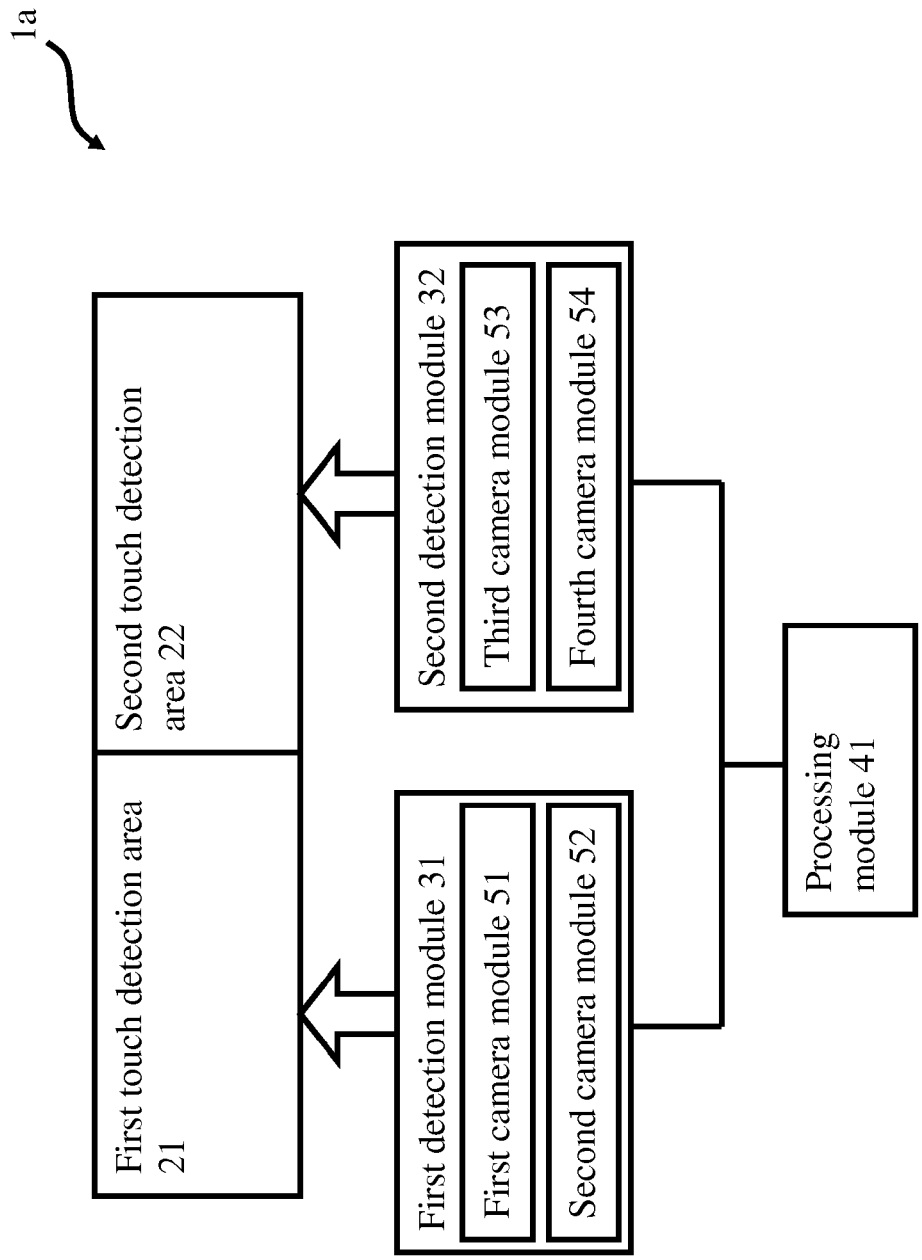
FIG. 2 is a structure schematic diagram of the first embodiment of the optical coordinate input device of the present invention.
Figure 3A:
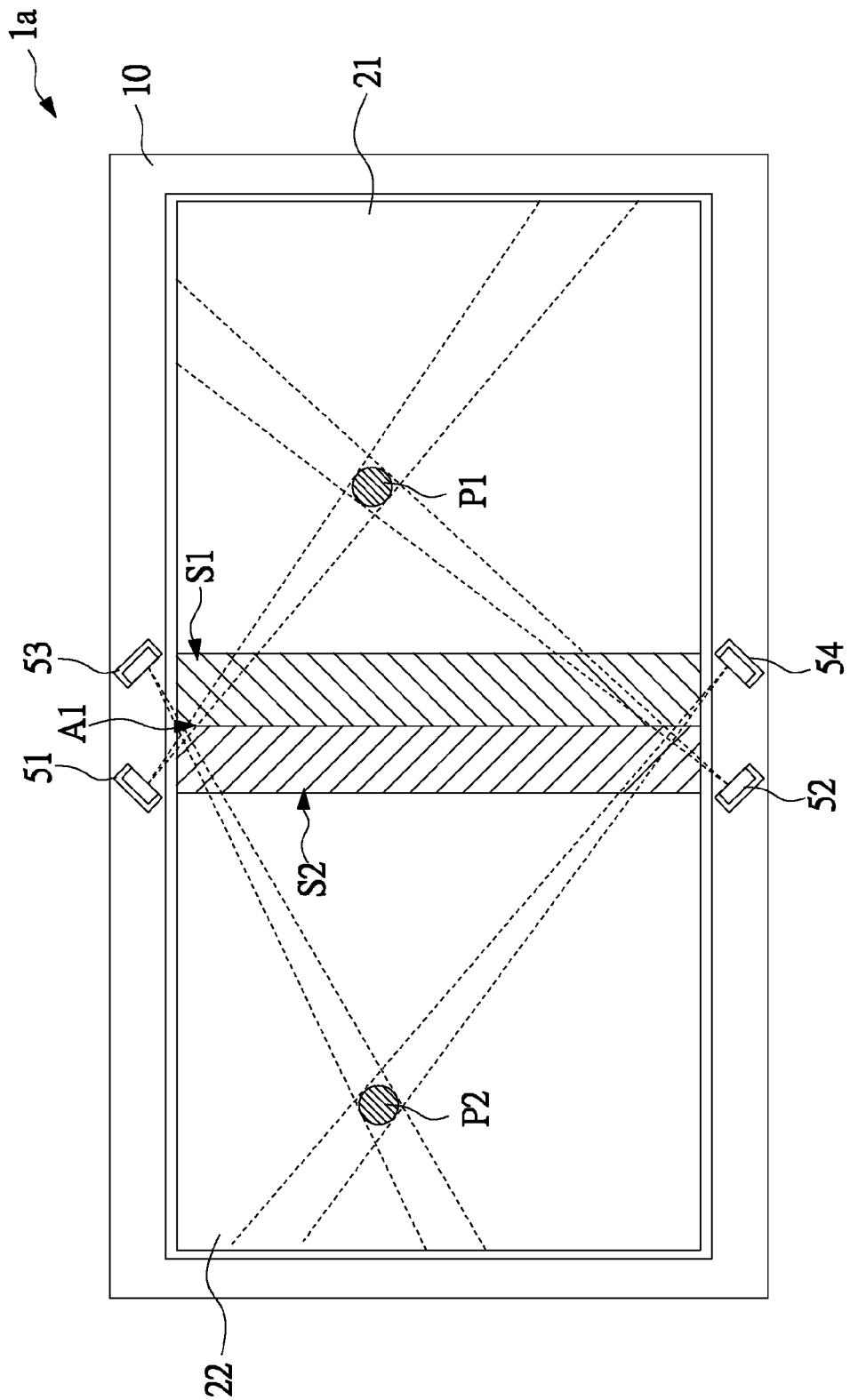
FIG. 3A is a front-view schematic diagram of the first embodiment of the optical coordinate input device of the present invention.
Figure 3B:
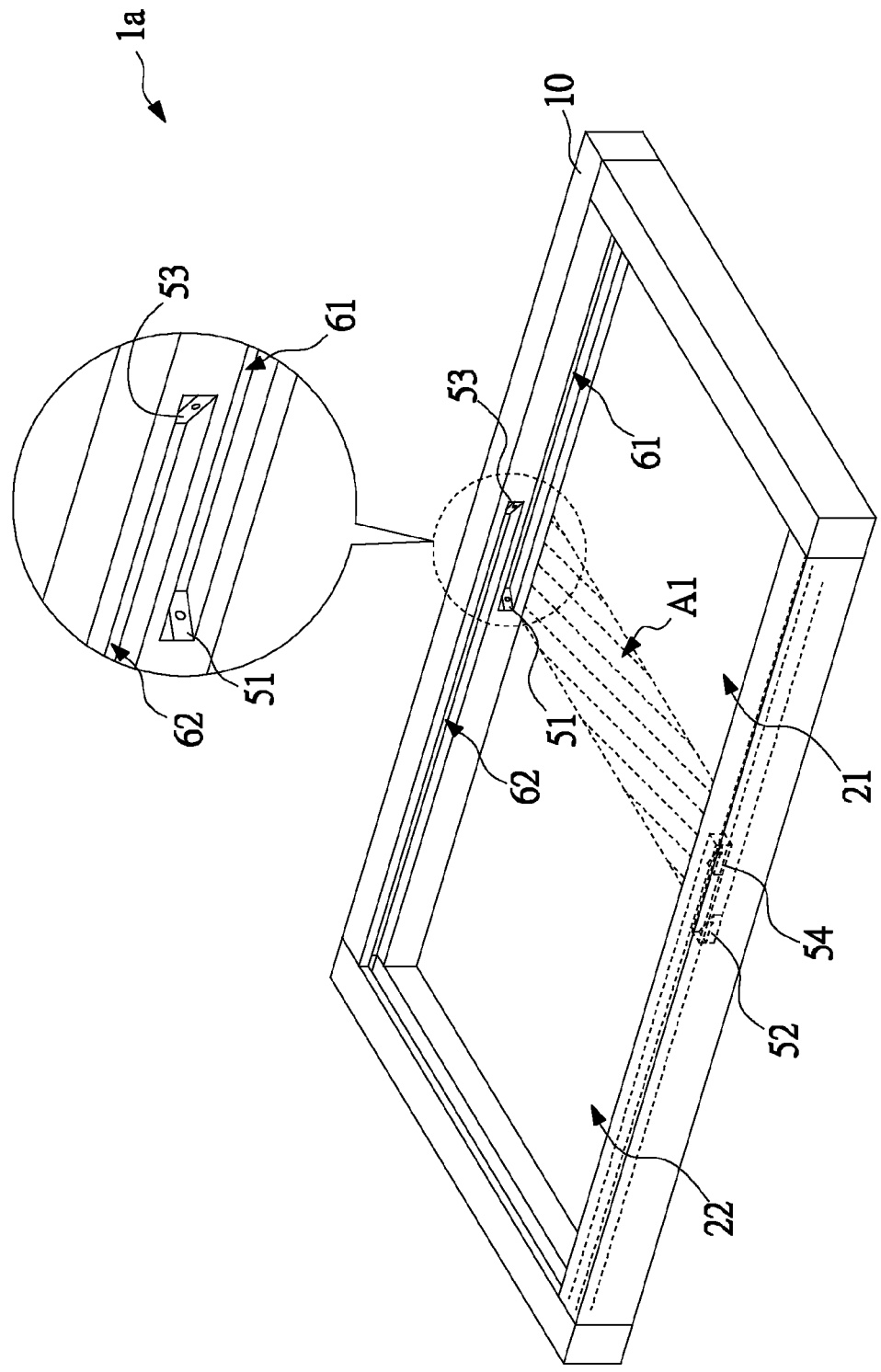
FIG. 3B is a 3D schematic diagram of the first embodiment of the optical coordinate input device of the present invention.

Please refer to FIG. 2 to FIG. 3B simultaneously, which are schematic diagrams relate to a first embodiment of the optical coordinate input device of the present invention. Wherein, FIG. 2 is a structure schematic diagram of the first embodiment of the optical coordinate input device of the present invention, FIG. 3A is a front-view schematic diagram of the first embodiment of the optical coordinate input device of the present invention, and FIG. 3B is a 3D schematic diagram of the first embodiment of the optical coordinate input device of the present invention.

The optical coordinate input device 1a of the present invention is suitable for an apparatus having a touch control range over than 100 inches, but the present invention is not limited by this spec. The optical coordinate input device 1a comprises a frame 10, a first touch detection area 21, a second touch detection area 22, a first detection module 31, a second detection module 32, and a processing module 41. The first detection module 31 has a first camera module 51 and a second camera module 52, and the second detection module 32 has a third camera module 53 and a fourth camera module 54. The height of the frame 10 could be between 18 mm to 24 mm, but the present invention is not limited by that. The first touch detection area 21 and the second touch detection area 22 are disposed inside the range of the frame 10, the second touch detection area 22 overlaps part of the first touch detection area 21, and the first touch detection area 21 and the second touch detection area 22 are provided for being touched by a user. A partial overlapped region A1 is provided between the first touch detection area 21 and the second touch detection area 22. The present invention does not limit the sizes of the first touch detection area 21 and the second touch detection area 22 have to be the same, different sizes of these two areas are acceptable.

The first detection module 31 and the second detection module 32 are disposed on the frame 10 and provided the touch control made by the user. When the user touches the first touch detection area 21 or the second touch detection area 22, a touch control point P1 or P2 is thus generated. The first detection module 31 and the second detection module 32 obtain the touch control point P1 or P2 and thus generate touch control signals. The first camera module S1 and the second camera module 52 of the first detection module 31 are disposed on the frame 10 near the second touch detection area 22, and used for facing the first touch detection area 21 thereby detecting a first touch control coordinate signal representing the touch control point P1 generated by the user touching the first touch detection area 21. Similarly, the third camera module 53 and the fourth camera module 54 of the second detection module 32 are disposed on the frame 10 near the first touch detection area 21, and used for facing the second touch detection area 22 for detecting. Thus, when the user touch the second touch detection area 22, a second touch, control coordinate signal representing the touch control point P2 could be generated. It has to be noted here that the first detection module 31 and the second detection module 32 are located on the different places of frame 10 having different thickness. In other words, the first detection module 31 and the second detection module 32 are located on different surfaces of the frame 10, so as to avoid signal disturbing between each other.

In first embodiment of the present invention, the first camera module 51 and the second camera module 52 of the first detection module 31 are respectively located on two relative sides of the second touch detection area 22. The third camera module 53 and the fourth camera module 54 of the second detection module 32 are respectively located on two relative sides of the first touch detection area 21. The frame 10 comprises a first reflective strip 61 and a second reflective strip 62, wherein the first reflective strip 61 and the first detection module 31 are located on the same place of the frame 10 having same thickness, i.e. the first reflective strip 61 and the first detection module 31 are placed on a same surface, surround the first touch detection area 21, and extend to connect the first camera module 51 and the second camera module 52 adjacent to the second touch detection area 22. Therefore, the first camera module 51 and the second camera module 52 could respectively emit invisible light signal, and then receive the signal reflected by the first reflective strip 61, thus detect whether there is a touch point P1 in the first touch detection area 21. Similarly, the second reflective strip 62 and the second detection module 32 are located on the same place of the frame 10 having same thickness, i.e. the second reflective strip 62 and the second detection module 32 are placed on a same surface, surround the second touch detection area 22, and extend to connect the third camera module 53 and the fourth camera module 54 adjacent to the first touch detection area 21. Therefore, the third camera module 53 and the fourth camera module 54 could respectively emit invisible light signal, and then receive the signal reflected by the second reflective strip 62, thus detect whether there is a touch point P2 in the second touch detection area 22.

At last, the processing module 41 is electrically connected to the first detection module 31 and the second detection module 32. When the first camera module 51 and the second camera module 52 of the first detection module 31, and the third camera module 53 and the fourth camera module 54 of the second detection module 32 obtain respectively a first touch control coordinate signal or a second touch control coordinate signal, the processing module 41 would determine whether there is a touch point P1 or P2 in the first touch detection area 21 and the second touch detection area 22 according to the first touch control coordinate signal or the second touch control coordinate signal, and then execute a coordinate calculation procedure to obtain a precise coordinate of the touch point P1 or P2 for the later processing procedure. The processing module 41 could also obtain the first touch control coordinate signal and the second touch control coordinate signal simultaneously to obtain the coordinate of the touch point P1 or P2.

It has to be noted here that a partial overlapped region A1 is provided between the first touch detection area 21 and the second touch detection area 22, and the partial overlapped region A1 corresponds to a sum of an overexposed buffer region S1 and S2 of the first camera module 51, the second camera module 52, the third camera module 53, and the fourth camera module 54. The overexposed buffer region S1 and S2 is changed with the spec of camera module, and the present invention does not limit the area size of the overexposed buffer region S1 and S2.

Figure 3C:
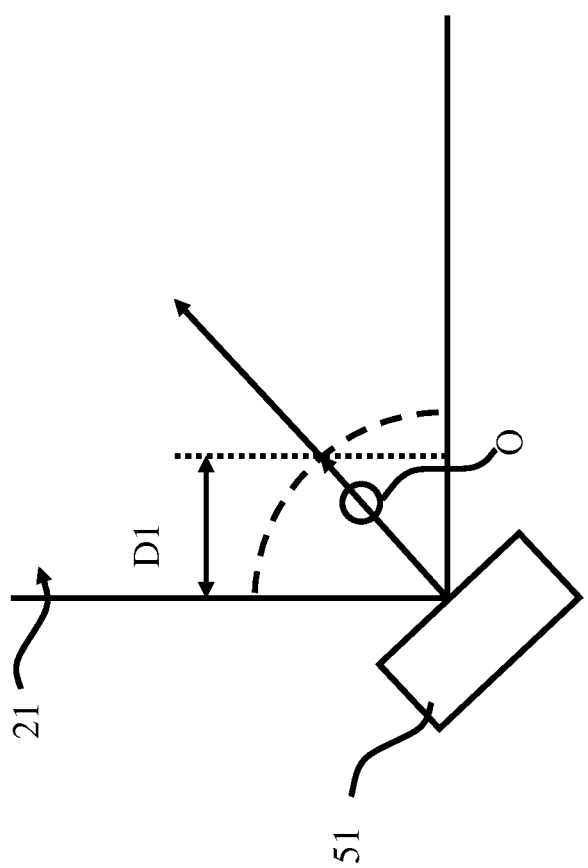
FIG. 3C is a schematic diagram of finding out an overexposed area of the camera module of present invention.

For example, the area size of the overexposed buffer region S1 and S2 can be found base on an overexposed area or a sheltered area of each camera module. Please refer to FIG. 3C is a schematic diagram of finding out an overexposed area of the camera module of present invention.

First, an object O is located on the first touch detection area 21 and in front of the first camera module 51. If a location of the object O is too close to the first camera module S1, because of the reflection of the object O, the first camera module 51 may detect another detection point. Therefore, when the first camera module 51 detects two detection points, it means the object O is located in an overexposed area of the first camera module 51. If the first camera module 51 detects one detection point, it means the object O is moved into a non-overexposed area of the first camera module 51. As a result, the overexposed area and an overexposed distance D1 of the first camera module 51 can be found out.

Figure 3D:
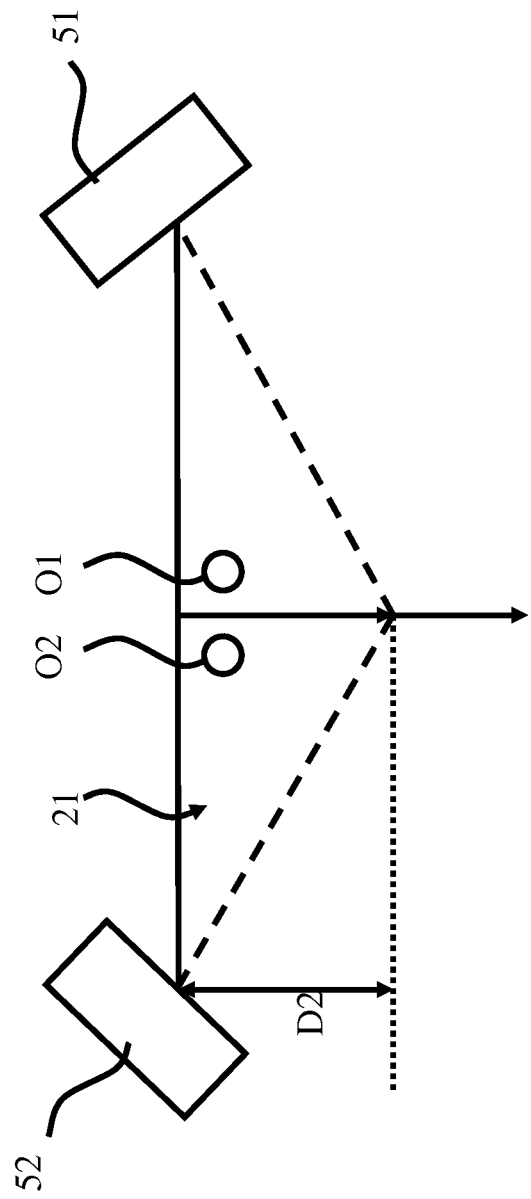
FIG. 3D is a schematic diagram of finding out a sheltered area between two camera modules of present invention.

Then please refer to FIG. 3D is a schematic diagram of finding out a sheltered area between two camera modules of present invention.

Next, disposing two objects O1 and O2 on the first touch detection area 21 and between the first camera module 51 and the second camera module 52 for moving the two objects O1 and O2 vertically from a middle of the first camera module 51 and the second camera module 52. If the location of any one object O1 or O2 is too close to the other object, the object may shelter another object when the camera module is detecting. Therefore, the camera module may detect only one detection point. If the first camera module 51 or the second camera module 52 only detects one detection point, it means the two objects O1 and O2 are located in the sheltered area of the first camera module 51 and the second camera module 52. If the first camera module 51 and the second camera module 52 both detect two detection points, it means the two objects O1 and O2 are moved into a non-sheltered area of the first camera module 51 and the second camera module 52. As a result, the sheltered area and a sheltered distance D2 of the first camera module 51 and the second camera module 52 can be found out. After finding out the overexposed distance D1 and the sheltered distance D2, the overexposed buffer region S1 can be set by the maximum value among the overexposed distance D1 and the sheltered distance D2. The overexposed buffer region S2 can also be found out base on the aforementioned method.

Thus, when the touch control point P1 is located in the overexposed buffer region S2 of the first camera module 51 and the second camera module 52, even the first camera module 51 and the second camera module 52 could also generate the first touch control coordinate signal, however in the overexposed buffer region S2, wrong coordinate signal would easily be obtained due to the overexposing. Therefore, the processing module 41 would execute the coordinate calculation procedure only according to the second touch control coordinate signal generated by the third camera module 53 and the fourth camera module 54 at this time, and the first touch control coordinate signal would not be calculated. Similarly, when the touch control point P2 is located in the overexposed buffer region S1, the processing module 41 would execute the coordinate calculation procedure only according to the first touch control coordinate signal generated by the first camera module 51 and the second camera module 52, thus a precise coordinate could be obtained.

By this way, the user could operate the first touch detection area 21 and the second touch detection area 22 simultaneously without being effected by the sizes of the first touch detection area 21 and the second touch detection area 22. The ways of calculating the coordinate by the optical coordinate input device and the later application after obtaining the coordinate are well-known to those skilled in the art, and they are not the improved point of the present invention, thus it would not be described here.

Figure 4:
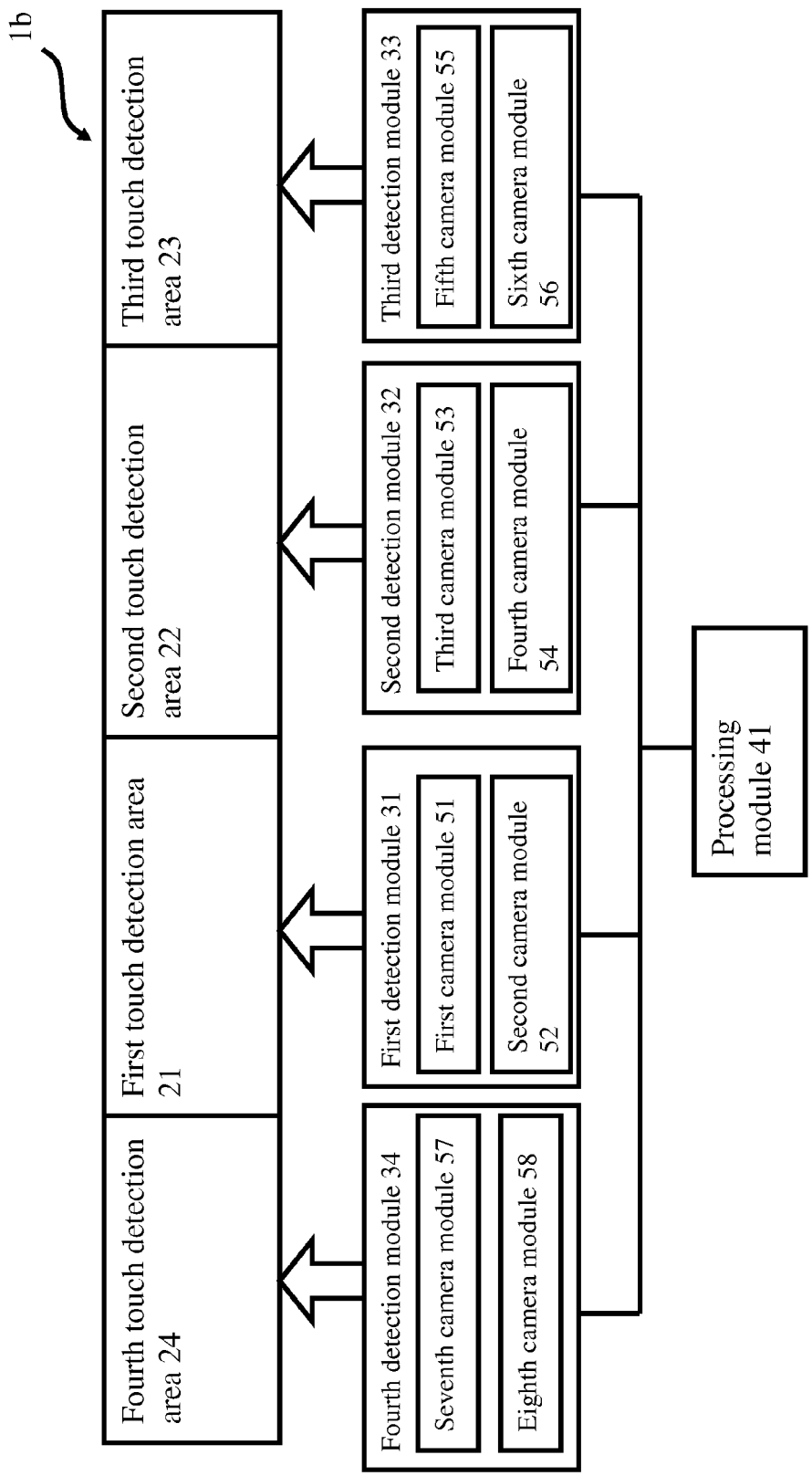
FIG. 4 is a structure schematic diagram of the second embodiment of the optical coordinate input device of the present invention.
Figure 5A:
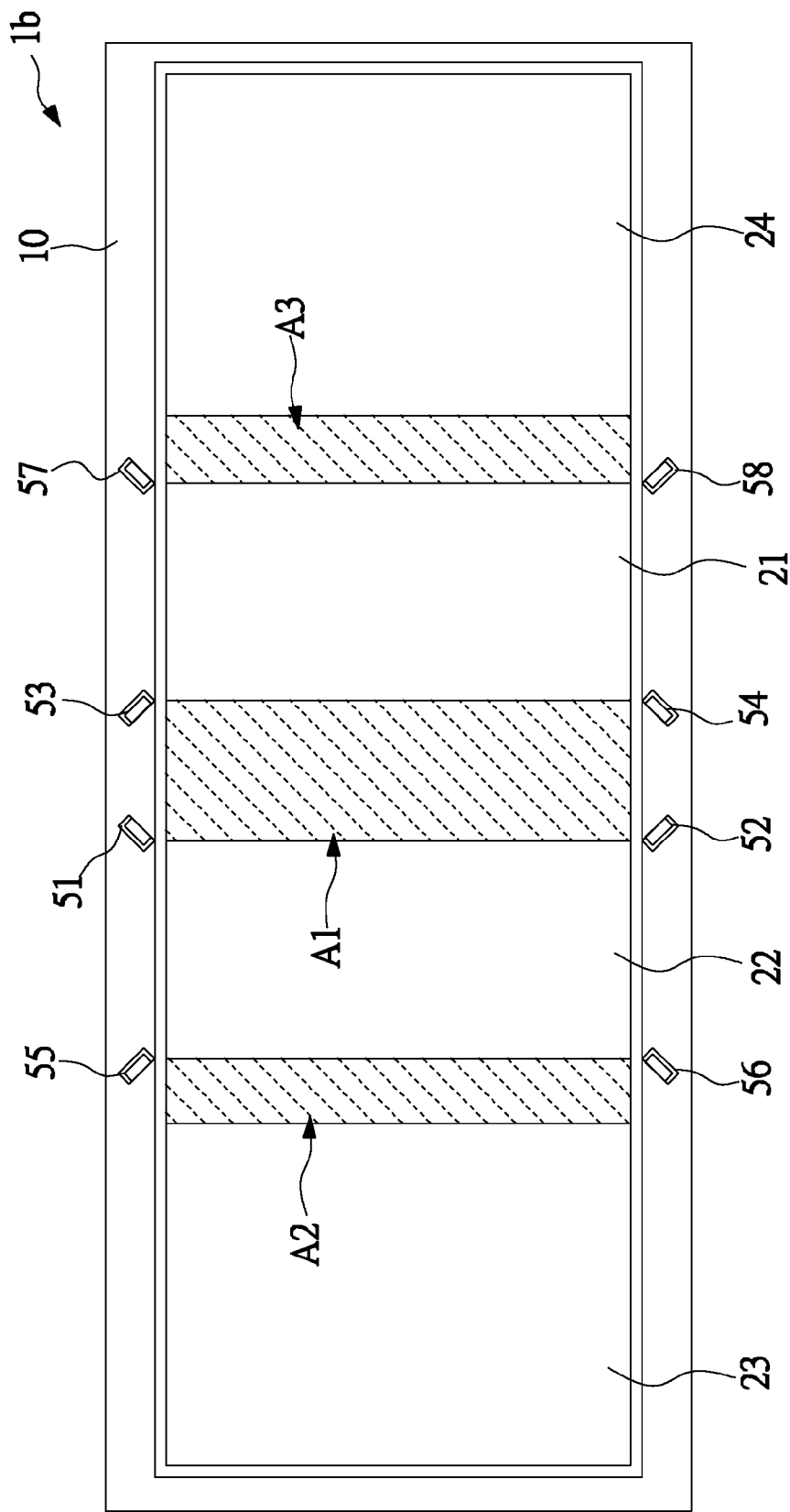
FIG. 5A is a front-view schematic diagram of the second embodiment of the optical coordinate input device of the present invention.
Figure 5B:
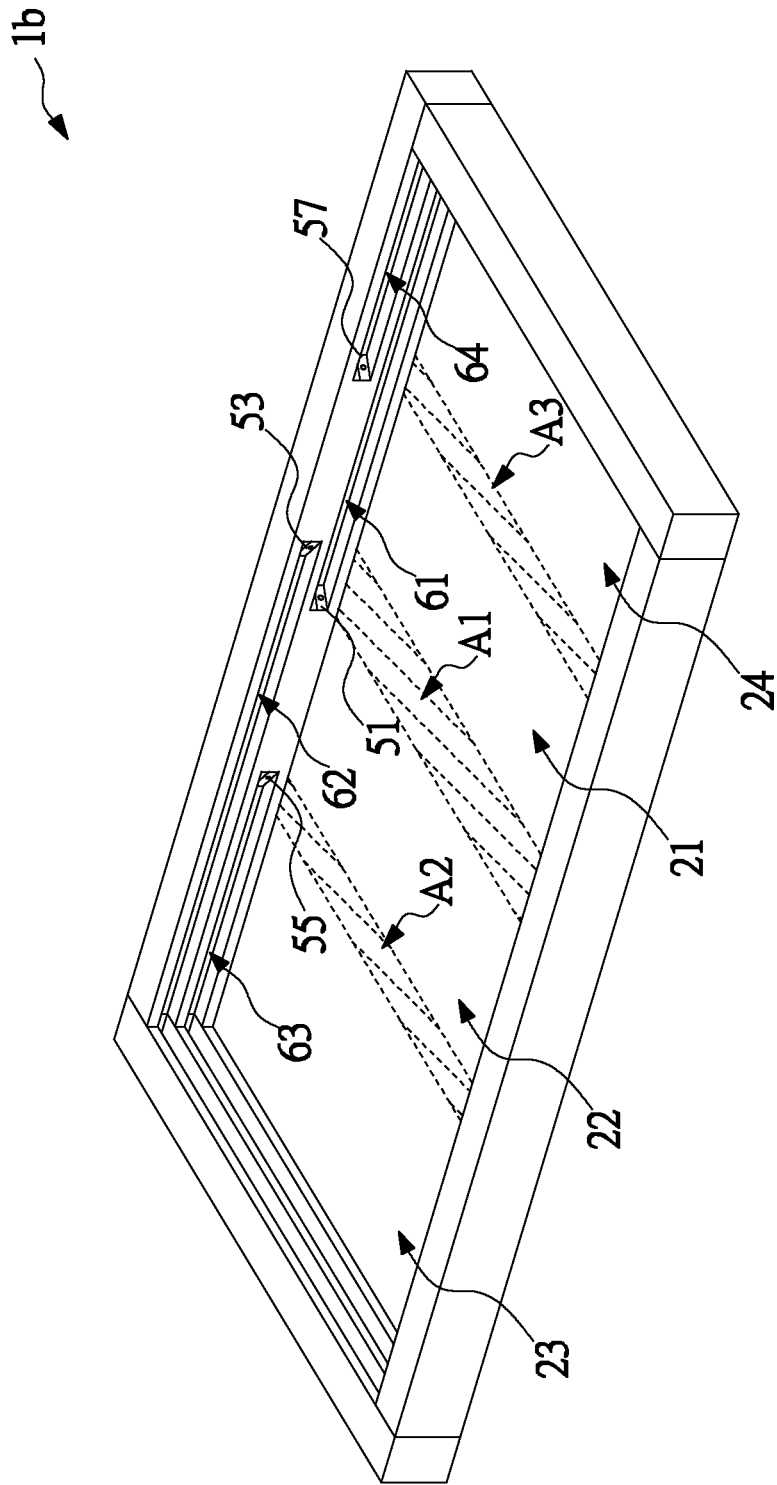
FIG. 5B is a 3D schematic diagram of the second embodiment of the optical coordinate input device of the present invention.

Next, please refer to FIG. 4 to FIG. 5B, which are the second embodiment of the optical coordinate input device of the present invention. Wherein, FIG. 4 is a structure schematic diagram of the second embodiment of the optical coordinate input device of the present invention, FIG. 5A is a front-view schematic diagram of the second embodiment of the optical coordinate input device of the present invention, and FIG. 5B is a 3D schematic diagram of the second embodiment of the optical coordinate input device of present invention.

The present invention is not limited in the scope of the first embodiment. As shown in FIG. 4, besides the first touch detection area 21 and the second touch detection area 22 abovementioned, the optical coordinate input device 1b could also comprises a third touch detection area 23 and a fourth touch detection area 24, and a third detection module 33 and a fourth detection module 34 provided for detecting the touch control in the third touch detection area 23 and the fourth touch detection area 24. The third detection module 33 comprises a fifth camera module 55 and a sixth camera module 56, and the fourth detection module 34 comprises a seventh camera module 57 and a eighth camera module 58. In the second embodiment of the present invention, the third touch detection area 23 overlaps partially the second touch detection area 22, and a partial overlapped region A2 is provided between the second touch detection area 22 and the third touch detection area 23. In addition, the fourth touch detection area 24 overlaps partially the first touch detection area 21, and a partial overlapped region A3 is provided between the first touch detection area 21 and the fourth touch detection area 24. It has to be noted here that in the second embodiment, the optical coordinate input device 1b is equipped with the third touch detection area 23 and the fourth touch detection area 24 simultaneously, but the present invention is not limited within this example, the optical coordinate input device 1b could only add the third touch detection area 23, or add new detection area and detection module depend on the demand.

The fifth camera module 55 and the sixth camera module 56 of the third detection module 33 are disposed on the frame 10 and near the second touch detection area 22, and provided for detecting the third touch detection area 23 and generating a third touch control coordinate signal when the user touches the third touch detection area 23. The seventh camera module 57 and the eighth camera module 58 of the fourth detection module 34 are disposed on the frame 10 and near the first touch detection area 21, and provided for detecting the fourth touch detection area 24 and generating a fourth touch control coordinate signal when the user touches the fourth touch detection area 24. Similarly, in the second embodiment of the present invention, the fifth camera module 55 and the sixth camera module 56 of the third detection module 33 are respectively located on two relative sides of the second touch detection area 22. The seventh camera module 57 and the eighth camera module 58 of the fourth detection module 34 are respectively located on two relative sides of the first touch detection area 21. The frame 10 further comprises a third reflective strip 63 and a fourth reflective strip 64 correspondingly. The third reflective strip 63 surrounds the third touch detection area 23, and connects to the fifth camera module 55 and the sixth camera module 56, thereby making the invisible light emitted by the fifth camera module 55 and the sixth camera module 56 be reflected by the third reflective strip 63, so as to detect the touch control point in the third touch detection area 23. The fourth reflective strip 64 surrounds the fourth touch detection area 24, and connects to the seventh camera module 57 and the eighth camera module 58, thereby making the invisible light emitted by the f seventh camera module 57 and the eighth camera module 58 be reflected by the fourth reflective strip 64, so as to detect the touch control point in the fourth touch detection area 24.

The third detection module 33 and the second detection module 32 are located on different places of the frame 10 having different thickness, i.e. the third detection module 33 and the second detection module 32 are located on different surfaces of the frame 10. The fourth detection module 34 and the first detection module 31 are located on different places of the frame 10 having different thickness, i.e. the fourth detection module 34 and the first detection module 31 are located on different planes of the frame 10. However, the third detection module 33 and the first detection module 31 could be located on the places of the frame 10 having same thickness, and the fourth detection module 34 and the second detection module 32 could be located on the places of the frame 10 having same thickness, the present invention does not limit it.

Similarly, a partial overlapped region A2 is provided between the second touch detection area 22 and the third touch detection area 23, and the partial overlapped region A2 corresponds to an overexposed buffer regions of the fifth camera module 55 and the sixth camera module 56. A partial overlapped region A3 is provided between the first touch detection area 21 and the fourth touch detection area 24, and the partial overlapped region A3 corresponds to an overexposed buffer region of the seventh, camera module 57 and the eighth camera module 58.

Finally, the processing module 41 further executes the coordinate calculating procedure according to the aforementioned first to fourth touch control coordinate signals, so as to obtain precise coordinates. By this way, the first detection module 31, the second detection module 32, the third detection module 33, and the fourth detection module 34 could be operated at the same time. An angle of 45 degree are provided between any one of the aforementioned camera modules and the frame 40, so as to obtain a best effect of emitting and receiving signal, however the present invention is not limited within this example.

Therefore, by the optical coordinate input device 1a or 1b of the present invention, it could be extended depend on the demand size of touch control region, and the problem of insufficient resolution ability due to large area could be avoided, and the overexposing problem due to the distance is too short could be solved.

In summary, regardless of the function, way and result of the present invention are shown different technical characteristics to prior arts, and it is a great break. Examiners would be appreciated to allow this patent after realizing the content of the present invention so as to benefit the society. However, the aforementioned embodiments are just for illustrating the principle and the result of the present invention, but not for limiting the range of the present invention. It will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention,

What is claimed is:

1. An optical coordinate input device, comprising:
   a frame;
   a first touch detection area;
   a second touch detection area, overlapping part of the first touch detection area, wherein the first touch detection area and the second touch detection area are provided for a user touching;
   a first detection module, disposed on the frame and adjacent to the second touch detection area for detecting the first touch detection area and generating a first touch coordinate signal when the user touches the first touch detection area;
   a second detection module, disposed on the frame and adjacent to the first touch detection area for detecting the second touch detection area and generating a second touch coordinate signal when the user touches the second touch detection area; wherein the first detection module and the second detection module are located on different surfaces of the frame; and
   a processing module, electrically connected to the first detection module and the second detection module, provided for executing a coordinate calculation procedure according to the first touch coordinate signal and the second touch coordinate signal so as to operate the first touch detection area and the second touch detection area simultaneously.

2. The optical coordinate input device as claimed in claim 1, wherein:
   the frame further comprises a first reflective strip and a second reflective strip;
   the first detection module has a first camera module and a second camera module, the first camera module and the second camera module are respectively located on two relative sides of the second touch detection area; wherein the first reflective strip surrounds the first touch detection area, and extends to connect the first camera module and the second camera module so as to allow the first camera module and the second camera module detect the first touch detection area through the first reflective strip; and
   the second detection module has a third camera module and a fourth camera module, the third camera module and the fourth camera module are respectively located on two relative sides of the first touch detection area; wherein the second reflective strip surrounds the second touch detection area, and extends to connect the third camera module and the fourth camera module so as to allow the third camera module and the fourth camera module detect the second touch detection area through the second reflective strip.

3. The optical coordinate input device as claimed in claim 2, wherein a partial overlapped region is provided between the first touch detection area and the second touch detection area, and the partial overlapped region corresponds to a sum of an overexposed buffer region of the first camera module, the second camera module, the third camera module, and the fourth camera module.

4. The optical coordinate input device as claimed in claim 3, wherein the overexposed buffer region is set by a maximum value among an overexposed distance or a sheltered distance of the first camera module, the second camera module, the third camera module, and the fourth camera module.

5. The optical coordinate input device as claimed in claim 2, wherein an angle of 45 degree are provided between any one of the camera module and the frame.

6. The optical coordinate input device as claimed in claim 1 further comprising:
   a third touch detection area, partially overlapping the second touch detection area; and
   a third detection module, disposed on the frame and adjacent to the second touch detection area for detecting the third touch detection area and generating a third touch coordinate signal when the user touches the third touch detection area;
   wherein the third detection module and the second detection module are located on different surfaces of the frame; wherein the processing module further executes the coordinate calculation procedure according to the third touch coordinate signal.

7. The optical coordinate input device as claimed in claim 6, wherein:
   the frame further comprises a third reflective strip; and
   the third detection module has a fifth camera module and a sixth camera module, the fifth camera module and the sixth camera module are respectively located on two relative sides of the second touch detection area;

wherein the third reflective strip surrounds the third touch detection area, and connects to the fifth camera module and the sixth camera module so as to allow the fifth camera module and the sixth camera module detect the third touch detection area through the third reflective strip.

8. The optical coordinate input device as claimed in claim 7, wherein a partial overlapped region is provided between, the second touch detection area and the third touch detection area, and the partial overlapped region corresponds to an overexposed buffer region of the fifth camera module and the sixth camera module.

9. The optical coordinate input device as claimed in claim 8, wherein the overexposed buffer region is set by a maximum value among an overexposed distance or a sheltered distance of the fifth camera module and the sixth camera module.

10. The optical coordinate input device as claimed in claim 7 further comprises:
  a fourth touch detection area, partially overlapping the first touch detection area; and
  a fourth detection module, disposed on the frame and adjacent to the first touch detection area for detecting the fourth touch detection area and generating a fourth touch coordinate signal when the user touches the fourth touch detection area;
  wherein the fourth detection module and the first detection module are located on different surfaces of the frame; wherein the processing module further executes the coordinate calculation procedure according to the fourth touch coordinate signal.

11. The optical coordinate input device as claimed in claim 10 further comprises:
  the frame further comprises a fourth reflective strip; and
  the fourth detection module has a seventh camera module and a eighth camera module, the seventh camera module and the eighth camera module are respectively located on two relative sides of the first touch detection area; wherein the fourth reflective strip surrounds the fourth touch detection area, and connects to the seventh camera module and the eighth camera module so as to allow the seventh camera module and the eighth camera module detect the fourth touch detection area through the fourth reflective strip.

12. The optical coordinate input device as claimed in claim 11, wherein a partial overlapped region is provided between the first touch detection area and the fourth touch detection area, and the partial overlapped region corresponds to an overexposed buffer region of the seventh camera module and the eighth camera module.

13. The optical coordinate input device as claimed in claim 12 wherein the overexposed buffer region is set by a maximum value among an overexposed distance or a sheltered distance of the seventh camera module and the eighth camera module.

14. The optical coordinate input device as claimed in claim 10, wherein the third detection module and the first detection module are located on the same surface of the frame, and the fourth detection module and the second detection module are located on the same surface of the frame.

* * * * *